(12) United States Patent
Morand

(10) Patent No.: US 8,704,674 B2
(45) Date of Patent: Apr. 22, 2014

(54) DEVICE FOR DETECTING WRONG POSITION OF A CONTAINER IN A CONTAINER HANDLING MACHINE

(75) Inventor: Sebastien Morand, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 910 days.

(21) Appl. No.: 12/741,507

(22) PCT Filed: Nov. 7, 2007

(86) PCT No.: PCT/IB2007/004271
§ 371 (c)(1),
(2), (4) Date: Aug. 25, 2010

(87) PCT Pub. No.: WO2009/060256
PCT Pub. Date: May 14, 2009

(65) Prior Publication Data
US 2010/0315254 A1 Dec. 16, 2010

(51) Int. Cl.
*G08B 21/00* (2006.01)
*B65G 43/00* (2006.01)
*B65G 47/00* (2006.01)
*B67B 7/00* (2006.01)

(52) U.S. Cl.
USPC ............... 340/686; 198/502.1; 198/502.2; 340/686.1; 340/679; 340/680

(58) Field of Classification Search
USPC ............ 340/689, 686.1, 679, 680; 198/502.1, 198/502.2
See application file for complete search history.

(56) References Cited

U.S. PATENT DOCUMENTS

| 3,219,972 | A  | * | 11/1965 | Williams   | 340/932.2 |
| 3,922,638 | A  | * | 11/1975 | Mendelsohn | 340/932.2 |
| 3,977,354 | A  | * | 8/1976  | Mazurek    | 116/28 R  |
| 4,239,116 | A  | * | 12/1980 | Eisenberg et al. | 209/523 |
| 5,231,392 | A  | * | 7/1993  | Gust       | 340/932.2 |
| 5,500,642 | A  | * | 3/1996  | Battle     | 340/932.2 |
| 5,507,245 | A  | * | 4/1996  | Kennedy    | 116/28 R  |
| 6,814,023 | B1 | * | 11/2004 | Foster     | 116/28 R  |
| 7,265,673 | B2 | * | 9/2007  | Teller     | 340/572.1 |
| 7,278,531 | B2 | * | 10/2007 | Hartness et al. | 198/470.1 |
| 2008/0044510 | A1 |  | 2/2008 | Doudement  |           |
| 2009/0014284 | A1 | * | 1/2009 | Langlois et al. | 198/803.9 |

FOREIGN PATENT DOCUMENTS

DE  1 250 754 C2  9/1969
DE  1 532 585 A1  2/1970
EP  1 781 460 A   5/2007

* cited by examiner

Primary Examiner — George Bugg
Assistant Examiner — Munear Akki
(74) Attorney, Agent, or Firm — Sughrue Mion, PLLC

(57) ABSTRACT

Device (10) for detecting wrong position of a container (2) in a container handling machine (1), comprising a movable contact element (11) provided with a trigger (34) coupled to an alarm sensor (33), said contact element (11) having a rest position wherein the trigger (34) blocks said alarm sensor (33), and a tilted position wherein the trigger (34) actuates the alarm sensor (33) to stop movement of the container (2).

9 Claims, 4 Drawing Sheets

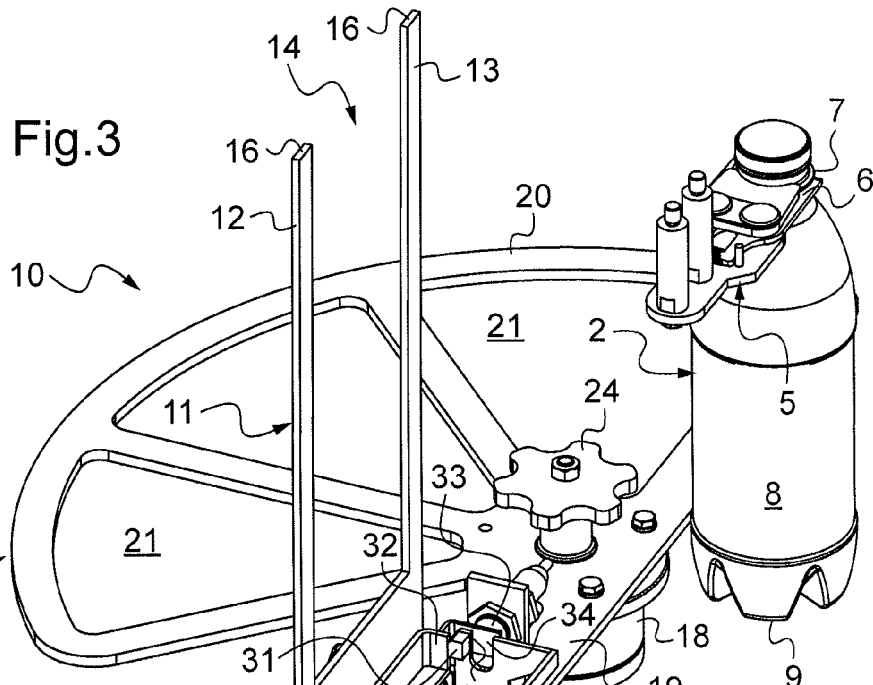
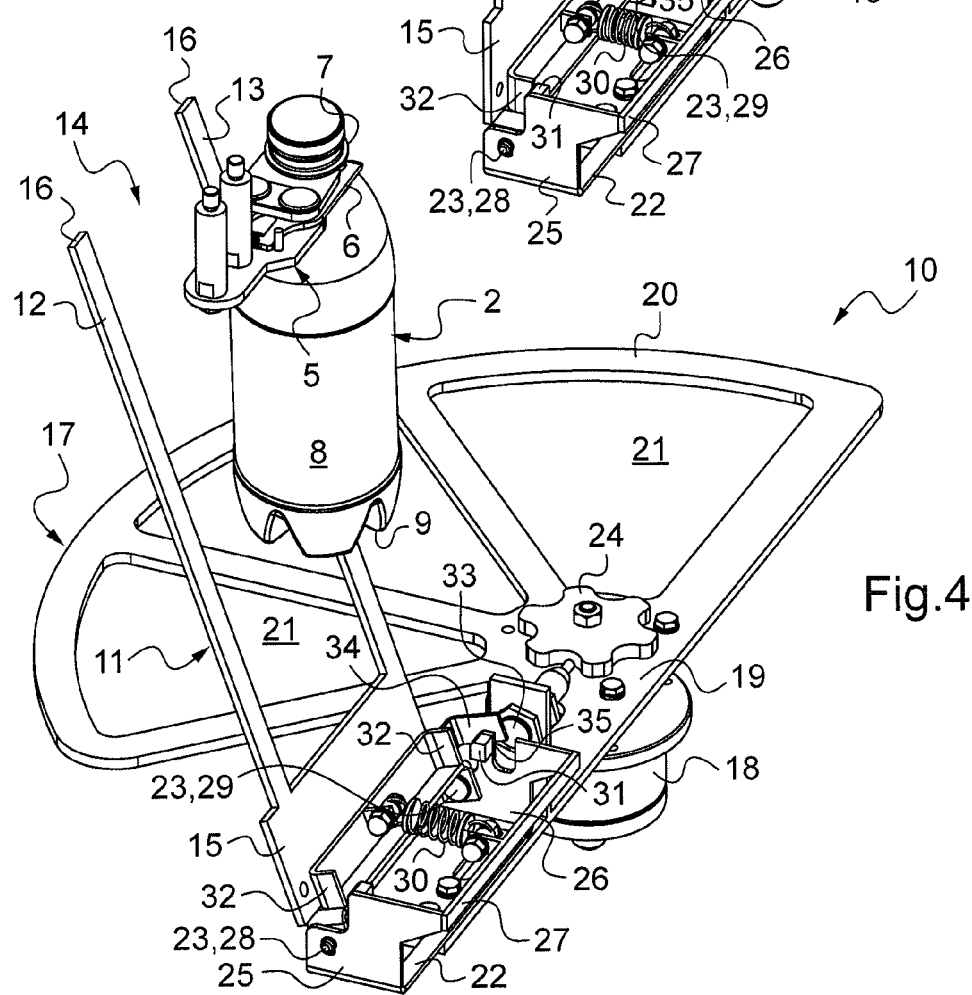

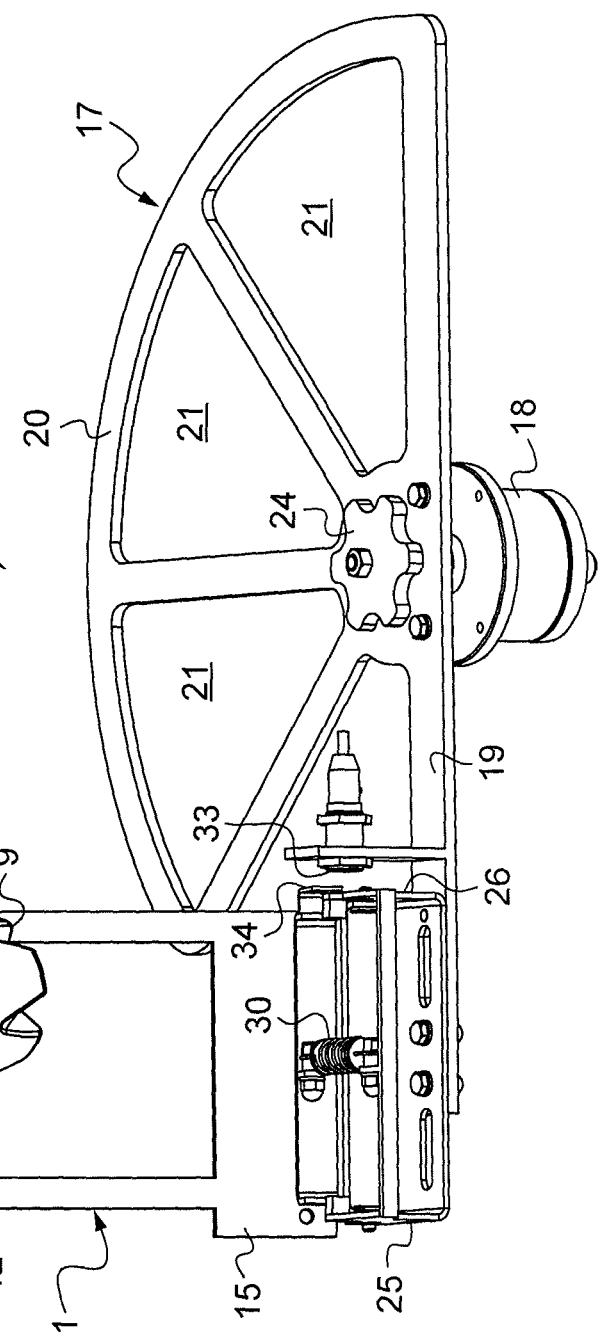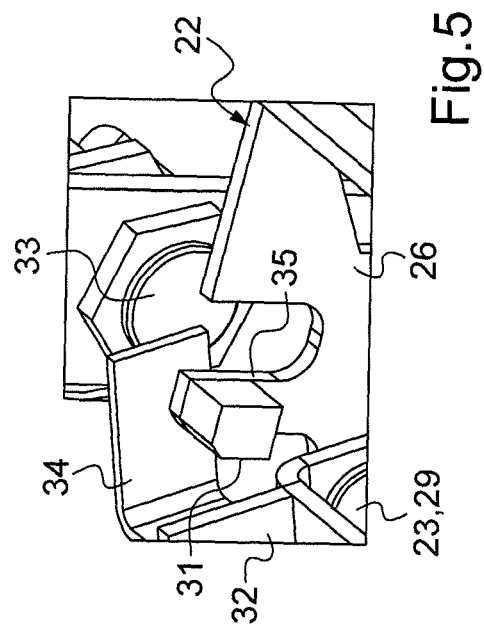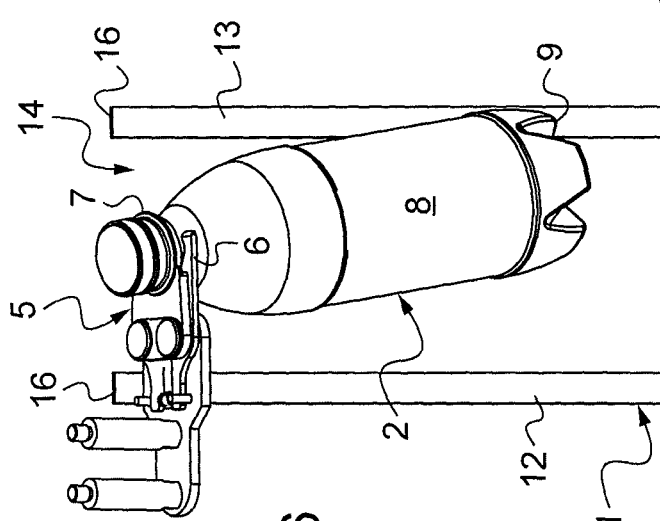

DEVICE FOR DETECTING WRONG POSITION OF A CONTAINER IN A CONTAINER HANDLING MACHINE

FIELD OF THE INVENTION

The invention relates to the field of container handling, and more precisely to the detection of wrong container position in container handling machines.

BACKGROUND OF THE INVENTION

Transportation of containers in container filling machines is a critical issue, for production rates have reached several tens of thousands of units per hour. During most of handling operations (e.g. filling, capping, transfer), containers are generally mounted on gripping elements provided at the periphery of a conveying starwheel.

In order to comply with the production rates, rotational speed of such a conveying starwheel (having e.g. a diameter of about 3 m and a capacity of around 50 containers) is higher than 15 rpm. Therefore, strong centrifugal forces are exerted on the containers, which imply a risk of the containers being ejected from the gripping elements, or at least a risk of the containers tilting and adopting a wrong position with respect of the normal vertical position. The risk of ejection or wrong positioning is higher for filled containers, given their weight. Ejection of a filled container may result in machine damage or even human injury. In addition to liquid waste, wrong position of a filled container may result in machine malfunction and/or damage during container transfer or capping.

The container industry is familiar with devices provided for ensuring that articles are normally held during the handling operations. When the articles are preforms or empty containers, any wrong positioned article is usually ejected by means of a safety device, see e.g. European patent application No. EP 1 781 460. However such a safety device is not adapted to filled containers, which should not be ejected when positioned in a wrong way, for the reasons stated hereabove.

SUMMARY OF THE INVENTION

It is an object of the invention to provide a device for reliably detecting wrong position of a container.

It is another object of the invention to provide a device for detecting wrong position of a container without necessarily ejecting a wrong positioned container.

The proposed solution is, according to one object, a device for detecting wrong position of a container in a container handling machine, comprising a movable contact element provided with a trigger coupled to an alarm sensor, said contact element having a rest position wherein the trigger blocks said alarm sensor, and a tilted position wherein the trigger actuates the alarm sensor to stop movement of the container.

In a preferred embodiment, the contact element is a gate having an aperture defining a passage for a container. The gate is preferably U-shaped and has two lateral arms limiting said aperture.

The contact element is for example pivotally mounted on a supporting frame around a rotation axis. The supporting frame is e.g. provided with at least one stop against which said contact element abuts in the rest position.

In a preferred embodiment, the frame is fixed to a support wheel pivotally mounted with respect of a rotation axis, said support wheel comprising a support arm to which said frame is fixed, and a flywheel located opposite to the support arm with respect of the rotation axis.

As the alarm sensor is preferably a presence sensor, the trigger may comprise a tongue whereby, in said rest position, the tongue is located in front of the presence sensor, whereas in the tilted position the tongue is away form the presence sensor.

The tongue may be located between the presence sensor and a lateral flange of the supporting frame, said lateral flange including a cut out located vis-à-vis the presence sensor.

A return spring may be provided for biasing the contact element towards its rest position.

According to another object, there is proposed a container handling machine including a detection device as disclosed hereinbefore.

The above and other objects and advantages of the invention will become apparent from the detailed description of preferred embodiments, considered in conjunction with the accompanying drawings.

BRIEF DESCRIPTION OF THE DRAWINGS

FIG. 3 is a perspective view of the device of FIG. 2, from another point of view, also shown in its rest position.

FIG. 4 is a view similar to FIG. 3, showing the device in a tilted position.

FIG. 5 is an enlarged perspective view showing a detail of the device of FIG. 4.

FIG. 6 is a perspective view of the device of FIG. 3, shown in its tilted position.

DESCRIPTION OF PREFERRED EMBODIMENTS

Figure 1:
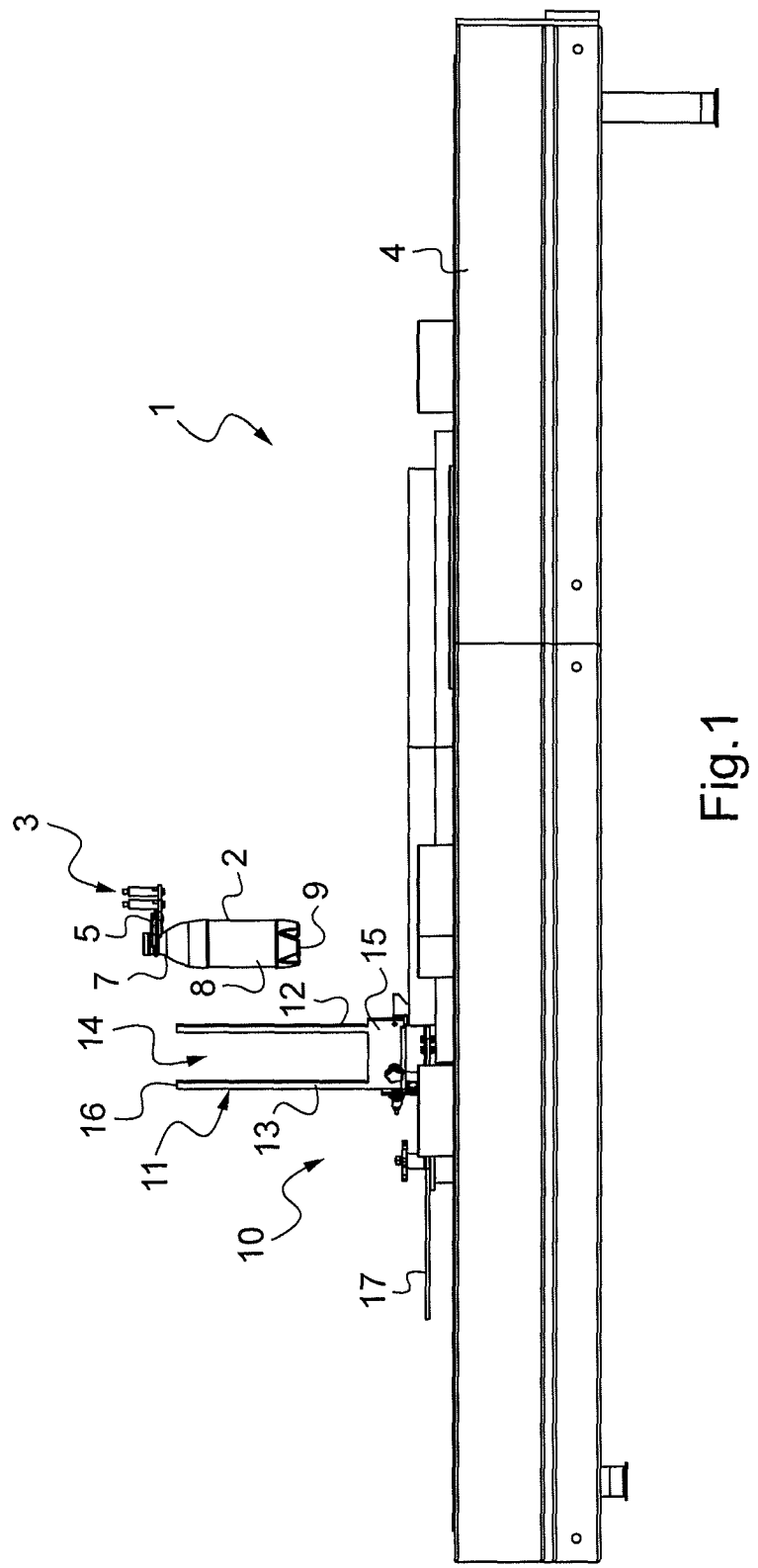
FIG. 1 is a partial side view of a container handling machine.

Referring now to the figures, there is partly shown a machine 1 for handling containers 2, such as bottles for liquid beverages. The machine 1 partly shown on FIG. 1 is for example a filling unit, and includes a star wheel 3 pivotally mounted on a machine frame 4. The star wheel 3 is provided on its circumference with a plurality of gripping devices 5 each including a pair of fingers 6 pivotally mounted along the circular edge of the star wheel 3. For the sake of clarity, only one gripping device 5, with a corresponding container 2 suspended thereto, is represented on the drawings. Each container 2 comprises a neck 7, by which it is suspended to a gripping device 5, a substantially cylindrical body 8 and a bottom 9.

The machine 1 also comprises a device 10 for detecting wrong position of a container 2 on the star wheel 3, preferably after it has been filled and before it is capped. Accordingly, the detection device 10 is located between, on the one hand, a filling area and, on the other hand, a capping area or a transfer area to an adjacent starwheel conveying the containers 2 to a distant capping area.

As depicted on FIG. 2-6, the detection device 10 comprises a movable contact element 11 under the form of a U-shaped gate having two lateral arms 12, 13 limiting a central aperture 14 which defines a passage for the containers 2 along their circular path.

The gate 11 may be made from a flat metallic plate which has been cut. The gate 11 comprises a solid lower portion 15, rectangular in shape, from which the lateral arms 12, 13 extend parallel to each other. The lower portion 15 of the gate 11 is located beneath a horizontal annular surface swept by the bottoms 9 of the containers 2, in order to prevent the bottoms 9 from colliding with the lower portion 15 of the gate 11.

The distance between the arms 12, 13 is greater than a diameter of the container body 8, in order to let pass a container 2 which is normally (i.e. vertically) held by a gripping device 5. In addition, the length of the arms 12, 13 is such that upper ends 16 thereof, opposite the lower portion 15, are located near the container neck 7—but at a certain distance from the surface swept by the gripping device 5, in order to avoid collision between the gripping device 5 and the gate 11.

Figure 2:
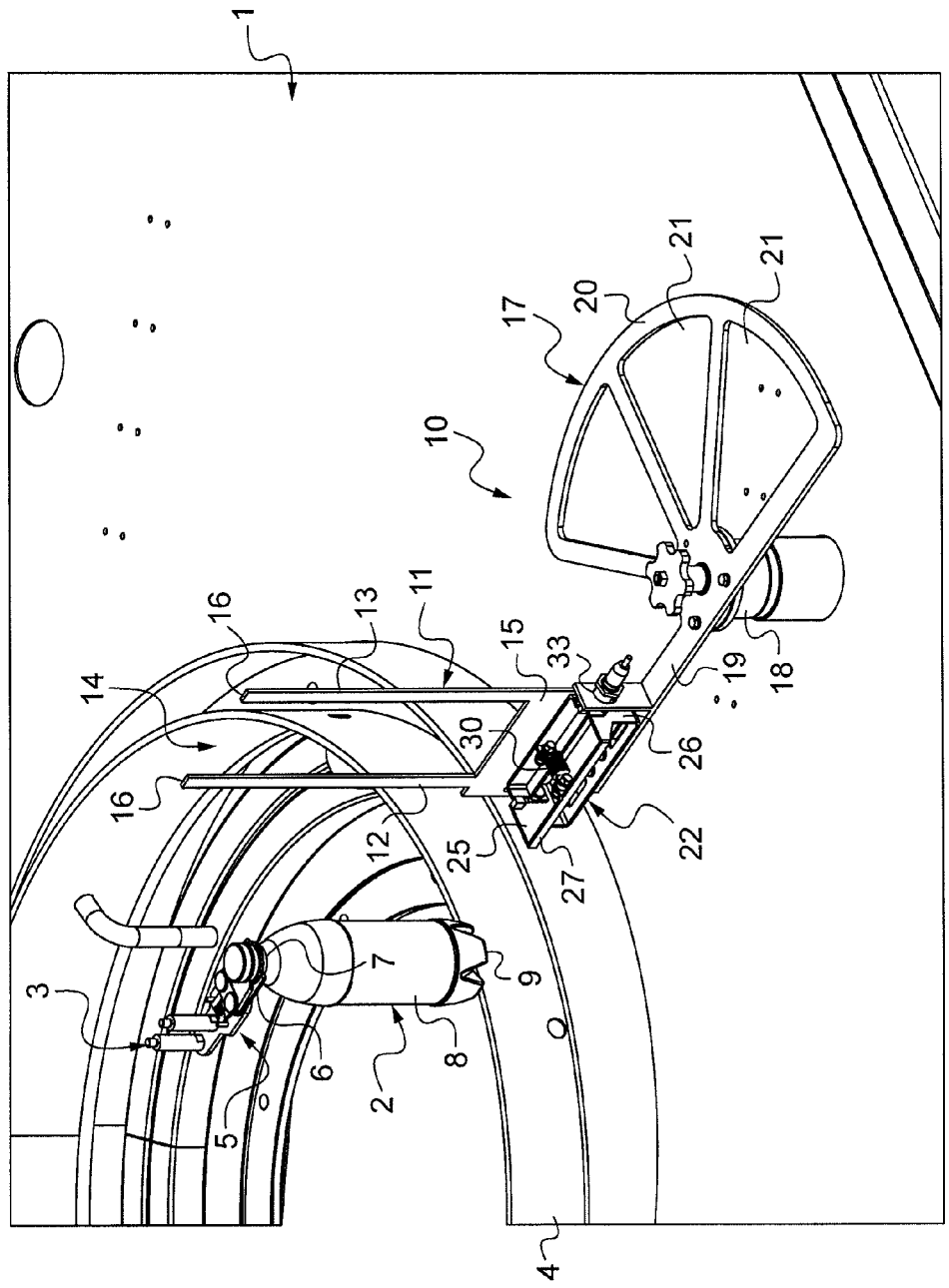
FIG. 2 is a perspective view of a detail of the container handling machine of FIG. 1, showing a device for detecting wrong position of a container in the container handling machine, shown in a rest position.

As depicted e.g. on FIG. 2, the detection device 10 comprises a support wheel 17 pivotally mounted on the machine frame 4 around a vertical rotation axis 18. The support wheel 17 comprises a straight support arm 19 and a flywheel 20 having cut-outs 21 and extending over an arc of a circle opposite to the support arm 19 with respect of the rotation axis 18.

The movable gate 11 is pivotally mounted on a supporting frame 22 around a horizontal axis 23 extending radially with respect of the star wheel 3, which supporting frame 22 is fixed to the support arm 19.

The support wheel 17 is movable in rotation around its axis 18 between an active position (depicted on the figures) wherein the gate 11 is located on the path of the containers 2, and an inactive position wherein the gate 11 is moved away from the path of the containers 2. Rotation of the support wheel 17 may be achieved by manually steering the flywheel 20 by an angle of about 90° clockwise. A return rotation spring may be provided to bias the support wheel 17 towards its active position. In addition, as depicted on FIG. 3, a nut 24 is preferably provided, screwable on the rotation axis 18, to hold the support wheel 17 in a predetermined position (e.g. the active position).

The supporting frame 22 comprises two lateral flanges 25, 26 extending vertically, linked by a transversal beam 27. The movable gate 11 is rotatably mounted on the supporting frame 22 by means of two coaxial pins 28, 29 inserted in corresponding holes formed in each lateral flange 25, 26.

Accordingly, the gate 11 is movable between a rest position (see FIG. 3) wherein the arms 12, 13 extend vertically, and a tilted position wherein the arms 12, 13 extend in a plane forming an angle with a vertical plane. The detection device 10 includes a return tension spring 30 mounted between the beam 27 and the lower portion 15 of the gate 11, for biasing the gate 11 towards its rest position.

As depicted e.g. on FIG. 3, the supporting frame 22 is provided with at least one stop 31 (two stops 31 are provided in the depicted example) against which the gate 11 abuts in its rest position. More precisely, the stops 31 are formed by protrusions on inner faces of the lateral flanges 25, 26, against which pins 32 perpendicularly protruding from an inner face of the gate 11 come into abutment in the rest position.

The detection device 10 further comprises an alarm sensor 33 linked to an emergency shutdown system for stopping rotation of the star wheel 3 under triggering conditions which will be disclosed hereinafter. Furthermore, the gate 11 is provided with a trigger 34 coupled to the alarm sensor 33, whereby in the rest position of the gate 11 the trigger 34 blocks the alarm sensor 33, whereas in a tilted position the trigger 34 actuates the sensor 33 to stop movement of the star wheel 3 (and consequently the movement of the containers 2).

In a preferred embodiment, the sensor 33 is a presence sensor, such as a capacitive sensor, positioned adjacent a lateral flange 26 of the supporting frame 22, vis-à-vis a cut-out 35 formed therein. The trigger 34 consists of a tongue protruding from a lateral edge of the gate 11, and extending perpendicular thereto. The tongue 34 moves forth and back (depending upon the position of the gate 11) in a space provided between the lateral flange 26 and the presence sensor 33, whereby:

in the rest position of the gate 11, the tongue 34 is located in front of the presence sensor 33 (FIG. 3), thereby blocking the sensor 33. In other words, as long as the sensor senses the presence of a body (i.e. the tongue 34) in its vicinity, it is prevented from commanding shutdown of the machine 1, in the tilted position, the tongue 34 is shifted away from the presence sensor 33, thereby putting the sensor 33 in front of the cut-out 35 (FIG. 5) and therefore actuating the sensor 33. In other words, as the sensor 33 senses no body in its vicinity, it commands shutdown of the machine 1.

The detection device 10 works as follows.

Containers 2 clipped onto gripping devices 5 are conveyed along the circular path defined by the star wheel 3. As long as containers 2 are normally held, i.e. they extend vertically, they pass through the gate 11 without touching the lateral arms 12, 13. However, as soon as for any reason (failure of a gripping device 5, bad shape of the container 2, etc.) a container 2 is in a wrong position, i.e. it is tilted with respect of the regular vertical position, the body 8 or the bottom 9 collides with a lateral arm 12, 13 of the gate, thereby moving it to a tilted position wherein the sensor 33 is actuated and the machine 1 consequently stopped (FIG. 4-6).

Manual intervention of an operator may place the container 2 back in a regular position or simply extract the container 2 if necessary (for example if the container 2 is defective).

Accordingly, the risk of a wrong positioned container damaging the handling machine 1 or injuring a person is decreased. The detection device 10 may be set to be more or less sensitive to wrong position of the containers. For example, width of the aperture 14 may be reduced to make the detection device 10 more sensitive, or on the contrary increased to make the detection device 10 less sensitive. Also, rate of the return spring 30 may be decreased to make the detection device 10 more sensitive, or on the contrary increased to make the device 10 less sensitive.

The invention claimed is:

1. A device for detecting a wrong position of a container in a container handling machine, the device comprising a movable contact element provided with a trigger coupled to an alarm sensor, said movable contact element having a rest position wherein the trigger blocks said alarm sensor, and a tilted position wherein the trigger actuates the alarm sensor to stop movement of the container; and wherein said moveable contact element comprises a gate having and aperture defining a passage for the container.

2. The device according to claim 1, wherein said gate is U-shaped and has two lateral arms limiting said aperture.

3. The device according to claim 1, wherein said contact element is pivotally mounted on a supporting frame around a rotation axis.

4. The device according to claim 3, wherein the supporting frame is provided with at least one stop against which said contact element abuts in its rest position.

5. The device according to claim 3, further including a supporting wheel pivotally mounted around a rotation axis and comprising a support arm to which said supporting frame is fixed, and a flywheel located opposite the support arm with respect of the rotation axis.

6. The device according to claim 1, wherein said alarm sensor is a presence sensor, wherein said trigger comprises a tongue and wherein, in said rest position, the tongue is located in front of the presence sensor, whereas in the tilted position the tongue is away from the presence sensor.

7. The device according to claim 6, wherein said contact element is pivotally mounted on a supporting frame having a lateral flange, wherein said tongue is located between the presence sensor and the lateral flange, and wherein said lateral flange is provided with a cut-out located vis-à-vis the presence sensor.

8. The device according to claim 1, further including a return spring for biasing the contact element towards its rest position.

9. A container handling machine including the device according to claim 1.

* * * * *